US006173676B1

(12) United States Patent
Cole

(10) Patent No.: US 6,173,676 B1
(45) Date of Patent: *Jan. 16, 2001

(54) ADJUSTABLE POULTRY FEEDER ASSEMBLY

(75) Inventor: Theodore John Cole, Milford, IN (US)

(73) Assignee: CTB, Inc., Milford, IN (US)

( * ) Notice: Under 35 U.S.C. 154(b), the term of this patent shall be extended for 0 days.

This patent is subject to a terminal disclaimer.

(21) Appl. No.: 09/008,877

(22) Filed: Jan. 20, 1998

Related U.S. Application Data

(63) Continuation-in-part of application No. 08/962,787, filed on Nov. 3, 1997, now Pat. No. 5,941,193.

(51) Int. Cl.[7] .................................................. A01K 39/01
(52) U.S. Cl. ........................................ 119/57.4; 119/52.1
(58) Field of Search ........................... 119/52.1, 53, 57.4, 119/52.6, 51.01

(56) References Cited

U.S. PATENT DOCUMENTS

| Re. 25,589 | 6/1964 | Hostetler et al. | 119/57.4 |
|---|---|---|---|
| 1,666,322 | * 4/1928 | West | 119/52.1 |
| 2,667,858 | * 2/1954 | Cussotti | 119/52.1 |
| 3,105,463 | 10/1963 | Pilch | 119/57.4 |
| 3,230,933 | 1/1966 | Myers et al. | 119/53 |
| 3,325,055 | 6/1967 | Marshall | 119/56.2 |
| 3,388,690 | 6/1968 | Hostetler et al. | 119/53 |
| 3,415,228 | 12/1968 | Myers | 119/80 |
| 3,415,229 | 12/1968 | Myers | 119/51.11 |
| 3,479,947 | 11/1969 | Myers | 454/344 |
| 3,511,215 | 5/1970 | Myers | 119/53 |
| 3,523,519 | 8/1970 | Hostetler | 119/457 |
| 3,545,408 | 12/1970 | Wert | 119/51.11 |
| 3,585,970 | 6/1971 | Scott | 119/53 |
| 3,611,995 | 10/1971 | Murto | 119/457 |
| 3,628,505 | 12/1971 | Myers | 119/57.4 |
| 3,675,627 | 7/1972 | Myers | 119/72 |
| 3,776,191 | 12/1973 | Murto | 119/457 |
| 3,799,116 | 3/1974 | Hostetler | 119/57.4 |
| 3,811,412 | 5/1974 | Murto et al. | 119/53 |
| 3,827,405 | 8/1974 | Allen | 119/53 |
| 3,869,006 | 3/1975 | Hostetler | 177/60 |
| 3,904,082 | 9/1975 | Hostetler | 119/51.11 |
| 3,911,868 | 10/1975 | Brembeck | 119/53 |
| 4,003,339 | 1/1977 | Hostetler | 119/57.4 |
| 4,070,990 | 1/1978 | Swartzendruber | 119/53 |

(List continued on next page.)

FOREIGN PATENT DOCUMENTS 0105571 4/1984 (EP).

Primary Examiner—Peter M. Poon
Assistant Examiner—Elizabeth Shaw
(74) Attorney, Agent, or Firm—Trexler, Bushnell, Giangiorgi & Blackstone, Ltd.

(57) ABSTRACT

A feeder assembly for birds or other animals having a pan member, a feeder tube defining a channel for receiving feed from a feed supply and defining a brood gate opening, a plurality of wing members having a plurality of fingers for adjustably engaging the feeder tube, and a cone member disposed about the feeder tube and slidably mounted to the plurality of wing members by a plurality of engaging arms. The cone member is adapted to slide relative to the feeder tube between a raised position to open the brood gate opening and a lowered position to close the brood gate opening. The pan member and an end of the cone member define a feed opening for permitting feed to pass from the feeder tube to the pan member for presentation. The feed opening can be adjusted in size either by adjusting the wing members relative to the pan member or by sliding and adjustably positioning the cone member relative to the feeder tube and the wing members. The brood gate opening can be opened or closed in an adjustable manner by adjustably positioning the cone member relative to the feeder tube and the wing members. The elevation of the brood gate opening can be adjusted by adjusting the wing members relative to the pan member.

23 Claims, 5 Drawing Sheets

U.S. PATENT DOCUMENTS

| | | | |
|---|---|---|---|
| 4,226,211 | 10/1980 | Barrentine | 119/337 |
| 4,252,083 | 2/1981 | Gilst et al. | 119/51.11 |
| 4,317,430 | 3/1982 | Swartzendruber | 119/57.4 |
| 4,337,728 | 7/1982 | Van Gilst et al. | 119/57.4 |
| 4,476,811 | 10/1984 | Swartzendruber | 119/57.4 |
| 4,488,509 | 12/1984 | Awalt | 119/53 |
| 4,834,026 | 5/1989 | Brembeck et al. | 119/53 |
| 4,995,343 | 2/1991 | Cole et al. | 119/53 |
| 5,092,274 | 3/1992 | Cole et al. | 119/57.4 |
| 5,097,797 * | 3/1992 | Van Zee et al. | 119/57.4 |
| 5,113,797 | 5/1992 | Van Daele | 119/57.4 |
| 5,794,562 * | 8/1998 | Hart | 119/57.4 |
| 5,875,733 * | 3/1999 | Chen | 119/57.4 |

* cited by examiner

ADJUSTABLE POULTRY FEEDER ASSEMBLY

CROSS-REFERENCE

This is a continuation-in-part of application Ser. No. 08/962,787, now U.S. Pat. No. 5,941,193, filed on Nov. 3, 1997 entitled "Adjustable Poultry Feeder".

FIELD OF THE INVENTION

This invention relates to an adjustable feeder assembly for a feeding system for birds or other animals.

BACKGROUND

Utilization of efficient low-cost poultry feeding systems, which allow poultry and the like to be raised from inception to harvest with a minimum amount of time and effort, is a prerequisite to economic survival in the business of raising poultry. An important component of such poultry feeding systems are the poultry feeder assemblies that present the feed to the poultry.

Operation of one known type of poultry feeding system, for instance, commences with a supply of feed being conveyed from a storage hopper, through a series of transport conduits and ultimately into individual poultry feeder pan assemblies, which are readily accessible to the feeding poultry crop. An example of a feeder assembly that has been successful in connection with such a poultry feeding system is the feeder assembly disclosed in U.S. Pat. No. 4,834,026, which is incorporated herein in its entirety by reference. The poultry feeder assembly of the '026 patent includes a dome-shaped feeder body contoured to prevent poultry from roosting upon it and a feeder tube extending through an uppermost surface of the dome-shaped body to operatively connect with a feed transport conveyor system. Feed supplied by the transport conveyor falls into the feeder tube and is directed through a feed opening at the bottom of the dome-shaped body and into a pan of the feeder assembly which is disposed below the lowermost edges of both the dome-shaped body and feeder tube. The outer periphery of the pan, in combination with the outer wall of the dome-shaped body, forms a limited annular poultry feeding area accessible to a large number of feeding poultry.

Releasable and adjustable engagement between the pan and the remaining structure is facilitated by circumferentially-spaced wing members formed integral with and extending outwardly of the dome-shaped feeder body. The distal end of these wing members are provided with a plurality of closely-spaced fingers which can be adjustably positioned to interlock with a corresponding arrangement of flange members provided on an annular lip or rim portion of the pan to incrementally adjust the size of the feed opening. Utilization of materials with sufficient resilient flexibility to form the pan member of the poultry feeder assembly allows the feed system operator to manually release and adjustably position the fingers relative to the pan member, and thereby adjust the size of the feed opening, without the aid of any tool. Thus, the feeder can be easily adjusted at its point of use to accommodate a variety of different-sized birds and to adapt to a varying range of feed flow characteristics.

OBJECTS AND SUMMARY

It is object of the present invention to provide a feeder assembly defining a feed opening that can be adjusted in size in a manner similar to that of the feeder assembly of U.S. Pat. No. 4,834,026, but also in a manner wherein the wing members do not need to be re-positioned relative to the pan.

It is a still further objective of the present invention to provide such a feeder assembly wherein the level of feed in the pan member of the assembly can be readily adjusted.

It is a further object of the present invention to provide a feeder assembly having a feeder tube that defines a brood gate opening and a cone member slidably mounted to the feeder tube for adjusting the size of a feed opening at the bottom of the cone member and for adjustably opening and closing the brood gate opening.

It is a further object of the present invention to provide a feeder assembly wherein the feed opening can be adjusted in size in very fine increments and over a wide range of sizes.

In accordance with these and other objects, the present invention provides a feeder assembly for birds or animals having a pan member, a feeder tube defining a channel for receiving feed from a feed supply and defining a brood gate opening adapted to permit at least some of the feed to pass therethrough, a plurality of wing members joined to the feeder tube, and a cone member disposed about the feeder tube and slidably mounted to the plurality of wing members and adapted to slide relative to the wing members between a raised position and a lowered position to substantially open and substantially close the brood gate opening. The pan member and an end of the cone member define a feed opening for permitting the feed to pass from the feeder tube to the pan member for presentation and consumption. The feed opening decreases in size as the cone member is moved toward the lowered position.

The brood gate opening comprises at least one window defined by the feeder tube. In a preferred embodiment, for example, the brood gate opening comprises a plurality of circumferentially-spaced windows defined by the feeder tube. The cone member is adapted to be adjustably positioned relative to the feeder to adjust the size of the feed opening and so that the brood gate opening also can be partially opened and partially closed by the cone member in an adjustable manner. The cone member may include a rim, desirably adjacent its upper end, for substantially closing the brood gate opening when the cone member is in the lowered position. Additionally, in a preferred embodiment, each of the wing members includes at its distal end a plurality of engaging fingers for adjustably engaging the pan member and for adjusting the size of the feed opening and for adjusting the elevation of the brood gate opening.

The cone member may be slidably mounted to the plurality of wing members in any suitable manner. The rim slidingly engages the feeder tube. Additionally, the cone member may include a plurality of engaging arms slidably engageable with the wing members. With this embodiment, each of the arms is slidably received within an aperture defined by a respective wing member. Each arm includes a locking ledge, preferably at its distal or bottom end, for engaging the respective wing member. The locking ledges are adapted to prevent the cone member from disengaging from the wing members when the cone member is moved toward the raised position.

The cone member may be adjustably positioned relative to the feeder tube in any suitable manner. In a preferred embodiment, for example, the feeder assembly may include a connector in the form of pair of cords or the like secured to the cone member and a locking member for joining the cords together to or around a support. The support may, for example, be in the form of a wire that extends parallel to a feed supply conduit or in the form of the feed supply conduit. The locking member preferably is in the form of a cable clamp joined to the wire and moveable with the wire to enable the cone member to be adjustably positioned relative to the feeder tube.

The feeder assembly in accordance with the invention provides many benefits. For example, adjustably sliding the cone member relative to the feeder tube causes opening or closing of the brood gate opening in an adjustable manner and also causes the size of the feed opening to increase or decrease in an adjustable manner. Additionally, adjusting the wing members relative to the pan member causes the elevation of the brood gate opening to increase or decrease in an adjustable manner and also causes the size of the feed opening to increase or decrease in an adjustable manner.

Thus, with the feeder assembly in accordance with a preferred embodiment of the invention, the brood gate opening can be readily and adjustably opened or closed and the elevation of the brood gate opening can be readily adjusted. Additionally, the size of the feed opening can be readily adjusted in size by adjustably positioning the cone member relative to the feeder tube and the wing members, or by adjusting the wing members relative to the pan member. As a result, the level and amount of feed presented to the poultry can be readily adjusted.

Accordingly, the feeder assembly in accordance with a preferred embodiment of the invention enables the poultry grower to adjust the brood gate opening and the size of the feed opening quickly and easily during all of the various poultry growing stages, which provides convenience and flexibility to the poultry grower.

BRIEF DESCRIPTION OF DRAWINGS

The present invention and the advantages thereof will become more apparent upon consideration of the following detailed description when taken in conjunction with the accompanying drawings of which.

DETAILED DESCRIPTION OF PREFERRED EMBODIMENTS

Figure 1:
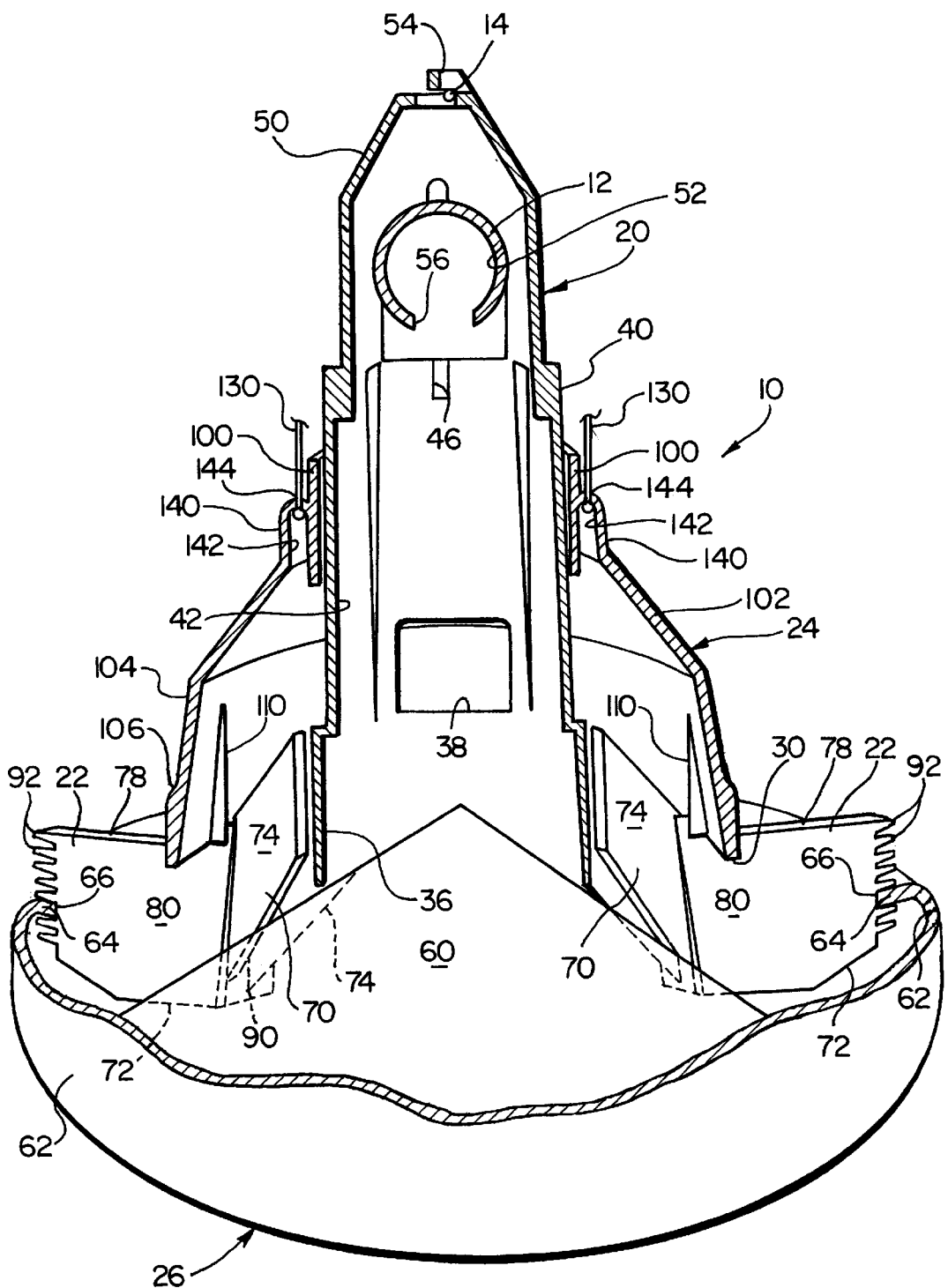
FIG. 1 is a cross sectional view of the feeder tube and cone member and a broken view of the pan member of the poultry feeder assembly mounted to a feed supply conduit and a wire of a poultry feeder system in accordance with one embodiment of the invention, illustrating the cone member in a lowered position.
Figure 2:
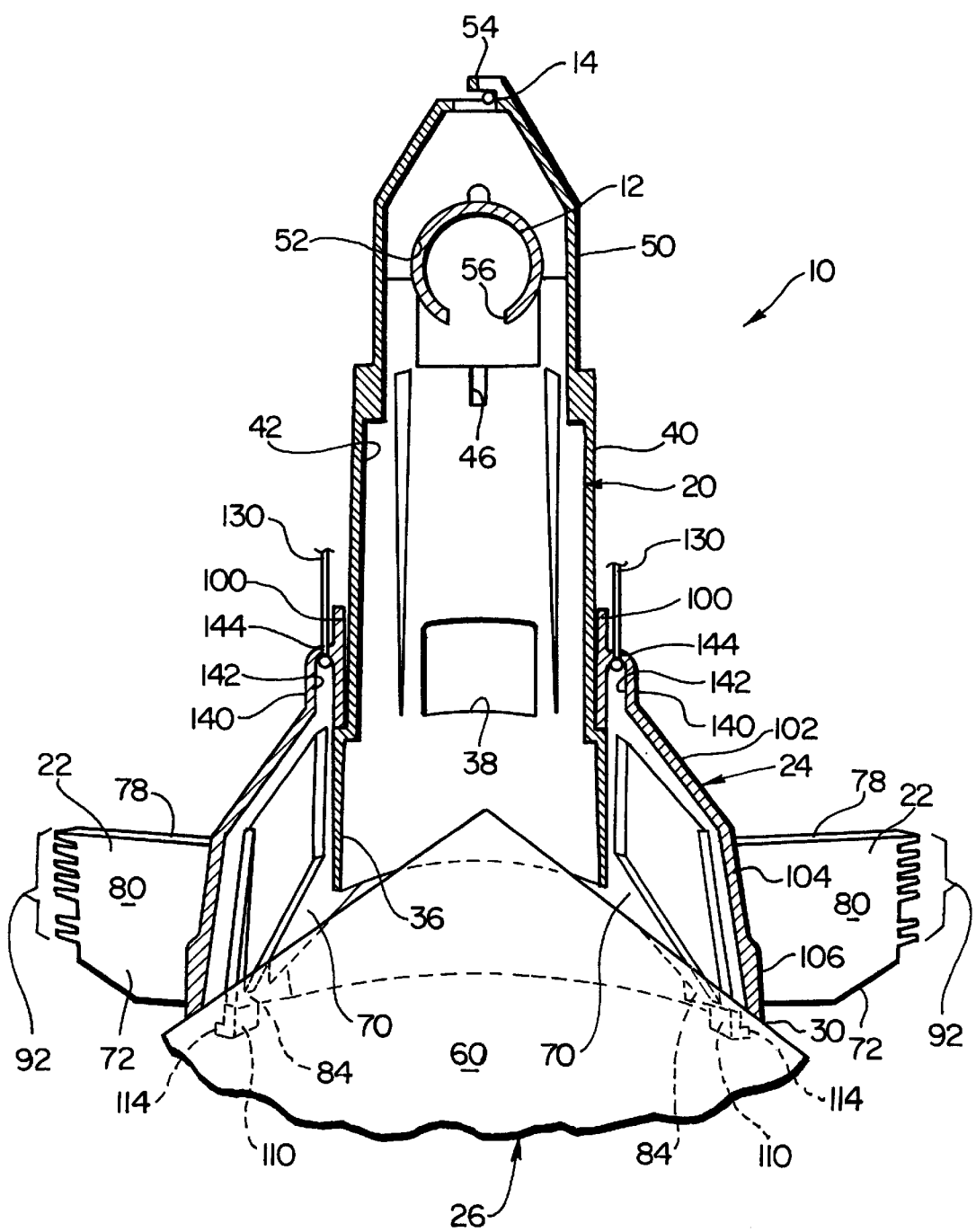
FIG. 2 is a cross sectional view of the feeder tube and cone member and a further broken view of the pan member of the poultry feeder assembly of FIG. 1, illustrating the cone member in a raised position.
Figure 3:
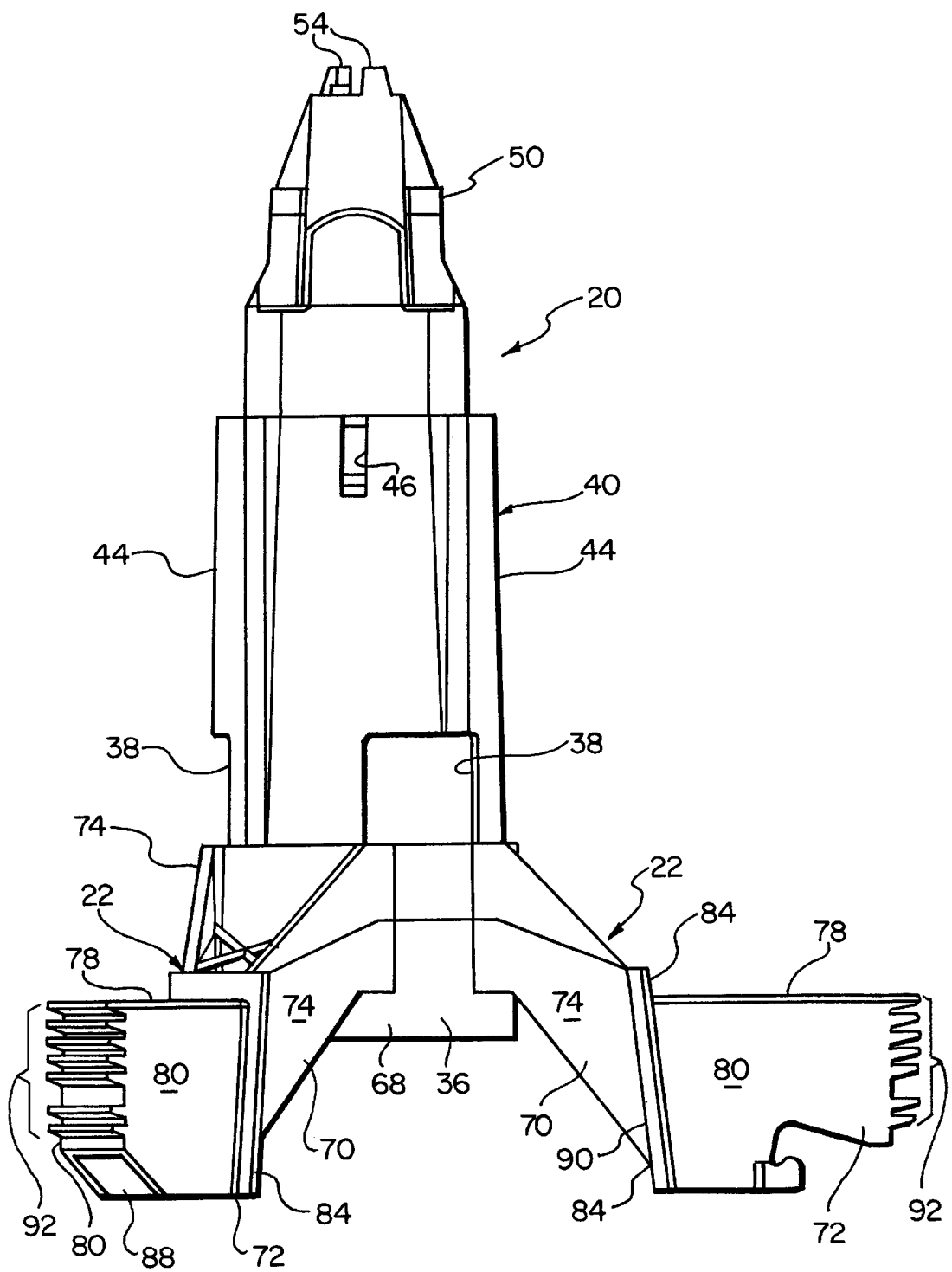
FIG. 3 is an elevation view of the feeder tube illustrated in FIGS. 1 and 2.
Figure 4:
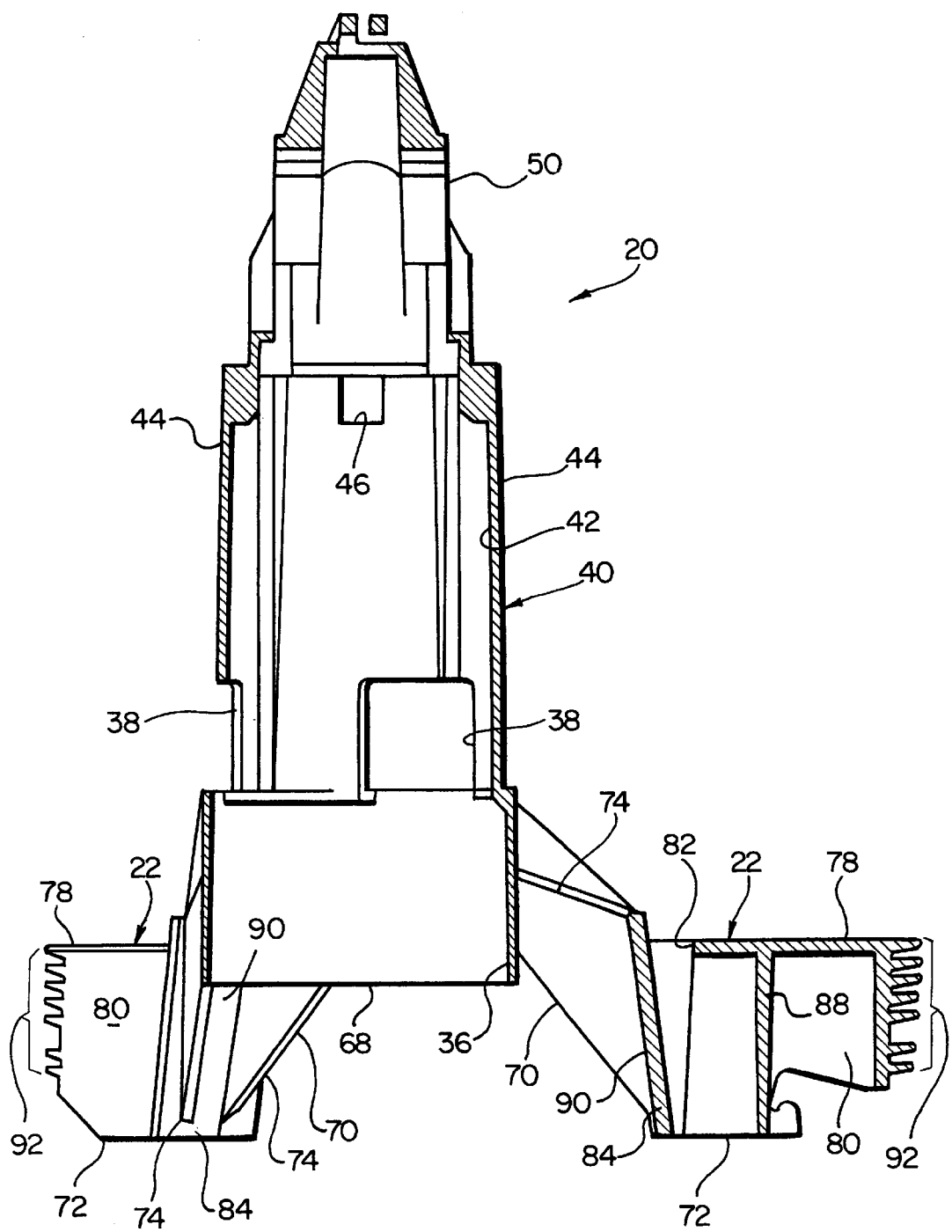
FIG. 4 is a cross sectional view of the feeder tube of FIGS. 1–3 taken along a longitudinal axis.

FIGS. 1–6 illustrate a feeder assembly 10 in accordance with a preferred embodiment of the invention. The illustrated feeder assembly 10 desirably is adapted to be used in connection with a poultry feeder system that includes a feed supply conduit 12 and desirably a wire 14 extending substantially parallel to the feed supply conduit 12. The wire 14 is often included with poultry feeder systems to ensure that birds cannot roost on the feeder assembly 10, and usually carries an electric current. Desirably, the feeder system includes a plurality of feeder assemblies 10, which can be vertically adjusted to either rest on the ground or be suspended above the ground by raising or lowering the feed supply conduit 12 or by any other suitable means.

The illustrated feeder assembly 10 generally comprises a feeder tube 20, three circumferentially-spaced wing members 22 joined to the feeder tube 20, a cone member 24 slidably engaged with both the feeder tube 20 and the wing members 22, and a pan member 26. A feed opening 30 is defined by a bottom rim 32 of the cone member 24 and the pan member 26, the size of which opening desirably can be adjusted in two different manners, as described in detail below.

The feeder tube 20 includes a hollow and generally cylindrical portion 40 and a collar 36 integral with the base of the cylindrical portion, and defines a channel 42 for receiving feed from the feed supply conduit 12. The collar 36, which desirably extends below the upper portions of the wing members 22, is intended to reduce the build up of feed within the cone member 24. The three wing members 22 desirably are integral with the collar 36 and radially extend from the collar for engagement with the pan member 26.

The cylindrical portion 40 of the feeder tube 20 defines a brood gate opening which, in the illustrated embodiment, is in the form of three circumferentially-spaced rectangular windows 38. The windows 38 can be adjustably opened and closed and the elevation of the windows can be adjusted, as described in detail below.

The feeder tube 20 desirably also includes four spaced ridges 44 extending along most of its length to facilitate sliding of the cone member 24 relative to the feeder tube 20. The illustrated feeder tube also defines a pair of diametrically opposed passages 46 for receiving cords 130 in any suitable manner. For example, each passage 46 may include a bore defined on the face of the respective cylindrical portion 40 and an opening defined by the top of the respective cylindrical portion. Each bore is contiguous with the respective opening to form the respective passage 46.

The feeder tube 20 also includes a locking part 50 at the upper end of the cylindrical portion 40 that may be integral with the cylindrical portion, as illustrated by FIGS. 1–4, or that may be instead may be releasably engaged with the cylindrical portion so that the feeder tube can be readily secured to the feed supply conduit 12 at the desired location. The locking part 50 defines a bore 52 for receiving the feed supply conduit 12. The bore 52 extends generally perpendicular to the channel 42. The locking part 50 desirably also includes a pair of engaging projections 54 for engaging the wire 14 of the feeder system. An opening 56 is defined in the feed supply conduit 12 through which feed can enter into the channel 42 of the feeder tube 20 from the feed supply conduit 12.

In a preferred embodiment, the pan member 26 is bowl-shaped and includes an upstanding conical portion 60 extending from the center of the pan member. The pan member 26 also includes an upstanding peripheral wall 62 that terminates in a rim 64. The rim 64 includes an inward flange 66 for engaging the wing members 22 as hereinafter described. If desired, the flange 66 may comprise a double flange arrangement.

In a preferred embodiment, the wing members 22 are spaced about the circumference collar 36 of the cylindrical portion 40, and each wing member 22 comprises a connecting portion 70 and a wing portion 72 integral therewith. The connecting portions 70 extend generally downwardly and radially outwardly from the collar 36 of the cylindrical portion 40. Each connecting portion 70 includes a pair of spaced side members 74 that converge toward each other as the side members extend toward the wing portion 72.

The wing portions 72 desirably extend radially outwardly from the ends of the connecting portions 70. Each wing portion 72 desirably comprises a top wall 78 joining together a pair of opposed side walls 80 that extend downwardly from the top wall. The top wall 78 of each wing portion 72 defines an aperture 82 (see FIG. 4) for slidably engaging the cone member 24 as hereinafter described. The side walls 80 desirably are parallel to each other, and are joined together along their inner or proximal ends by a sealing member 84. The outer side 86 of each sealing member 84 abuts the inner wall 88 of the cone member 24 and may be arcuate to complement the arcuate configuration of the inner wall.

Each of the illustrated sealing members 84 extends from the bottom of the respective pair of side walls 80 to beyond the top wall 78 of the respective wing portion 72. In the illustrated embodiment, each wing portion 72 also includes an internal reinforcement wall 88 connecting together the insides of the side walls 80. The side members 74 of the connecting portion 70 terminate at the inner sides 90 of the sealing members 84.

A plurality of closely spaced fingers 92 extend radially outwardly from the outer or distal ends of the side walls 80. The fingers 92 are adapted to adjustably engage the flange 66 of the peripheral wall 62 of the pan member 26 to permit adjustable positioning of the feeder tube 20 and the cone member 24 relative to the pan member. Since the size of the feed opening 30 depends upon the positioning of the cone member 24 relative to the pan member 26, the size of the feed opening can be adjusted by adjustably positioning the fingers 92 relative to the flange 66 of the pan member.

The cone member 24 is hollow and is disposed about the feeder tube 20. The cone member 24 desirably is configured to prevent poultry from roosting upon it. The illustrated cone member 24 includes a generally cylindrical top portion or rim 100 slidably engaging the feeder tube 20, a central conical truncated portion 102 and a base portion 104 that includes a circumferential ridge 106.

The rim 100 is configured to close the windows 38 when the cone member 24 is in the closed position (see FIG. 2) and partially open or close the windows as the cone member is raised or lowered. The height of the rim 100 desirably is about the same as or slightly greater than the height of the windows 38 so that the rim can seal the windows when the cone member 24 is in the lowered position. In the illustrated embodiment, for example, the rim 100 also extends downward from the central portion 102 so that the rim can substantially close the windows 38 when the cone member 24 is in the lowered position. In the illustrated embodiment, the base portion 104 also is tapered slightly.

Figure 5:
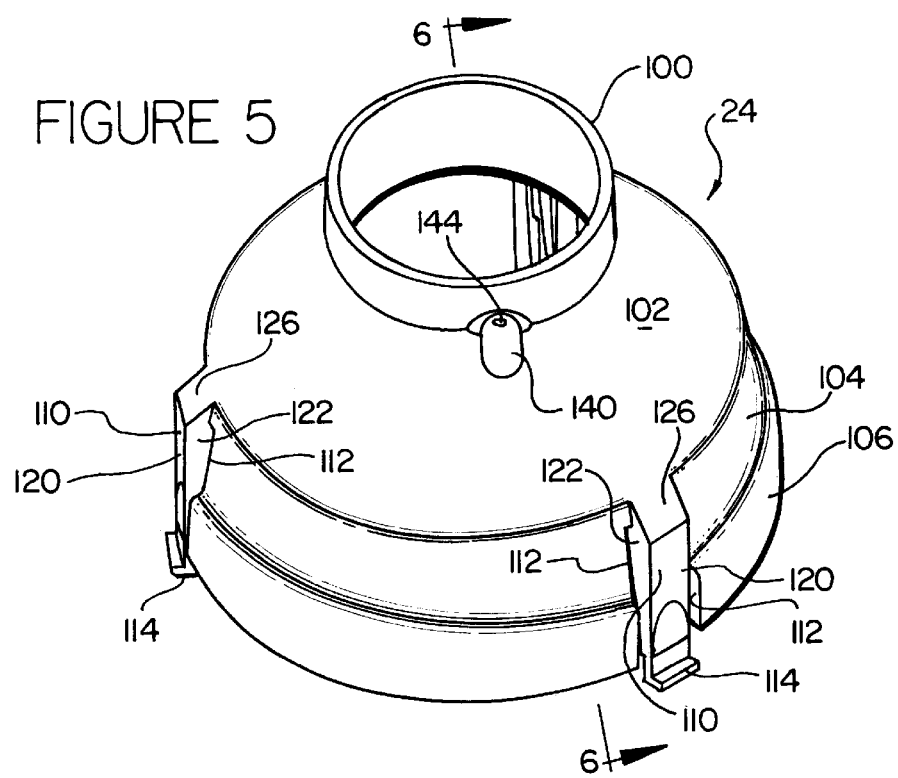
FIG. 5 is a perspective view of the cone member of the feeder assembly of FIGS. 1 and 2.
Figure 6:
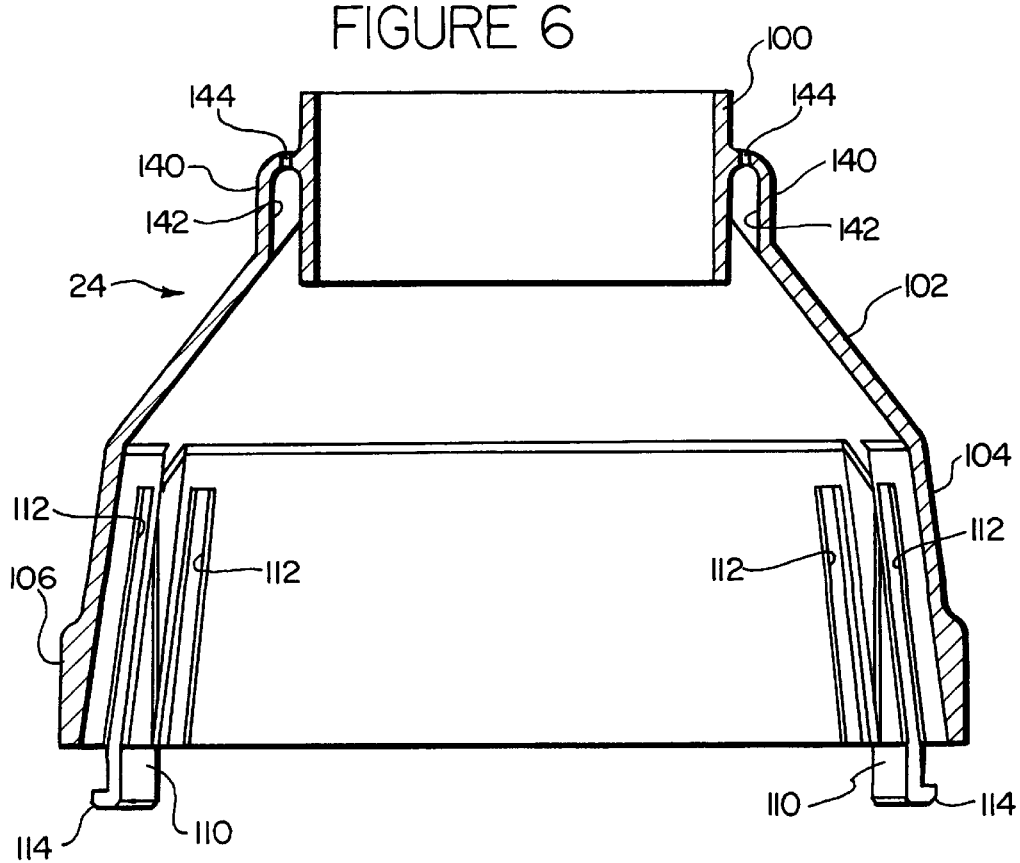
FIG. 6 is a cross-sectional view taken along the lines 6—6 of FIG. 5.

The base portion 104 of the cone member 24 includes three circumferentially-spaced engaging arms 110 and defines three pairs of slots 112, each of which is disposed about one of the engaging arms 110 (see, e.g., FIGS. 5 and 6). Each engaging arm 110 is slidably received by the aperture 82 of the wing portion 72 of a respective wing member 22, and each pair of slots 112 slidably receives the side walls 80 of the wing portion. In operation, the slots 112 desirably are closed at least in part by the sealing members 84 to minimize or reduce the amount of feed that would otherwise pass through the slots.

Each engaging arm 110 desirably includes a locking ledge 114 at its distal end. The locking ledge 114 desirably extends radially outwardly and is adapted to engage the bottom of the top wall 78 when the cone member 24 is moved to the raised position to prevent the cone member from disengaging from the wing portion during normal operating conditions. However, the engaging arms 110 desirably are flexible to facilitate manual engagement and disengagement of the cone member 24 with the wing members 22 when so desired.

Each engaging arm 110 desirably includes a front engaging surface 120 and a pair of opposed side engaging surfaces 122. The front and side engaging surfaces 120 and 122 extend from near the upper end of the base portion 104 beyond the bottom rim 32 of the cone member 24. In the illustrated embodiment, the engaging arms 110 protrude radially outwardly from the base portion 104 of the cone member 24. The front engaging surface 120 is joined to the upper end of the base portion 104 by an inclined surface 126. The front and side engaging surfaces 120 and 122 desirably extend in a generally vertical direction to facilitate vertical sliding action of the cone member 24 relative to the wing portions 72.

In a preferred embodiment, the feeder assembly also includes a pair of the cords 130 that are secured to the cone member and a locking member in the form of a cable clamp joining the cords with the wire 14. The cords 130 can be secured to the cone member 24 in any suitable manner, preferably 180° apart, and desirably extend around the feed supply conduit 12. In the illustrated embodiment, a pair of bosses 140 are formed 180° apart on the conical portion 102, and each bore defines a channel 142 and a hole 144 for receiving a respective cord 130. Each cord 130 also passes through one of the passages 46 defined by the feeder tube 20 to engage the feeder tube.

With this configuration, pulling of the wire 14 in one direction causes the cone member 24 to be raised relative to the feeder tube 20 and pulling of the wire in the other direction causes the cone member 24 to be lowered relative to the feeder tube 20. The pulling of the wire 14 can be accomplished in any suitable manner such as, for example, by turning a winch associated with the wire. If desired, the adjustable positioning of the cone member 24 relative to the feeder tube 20 can be accomplished in any other suitable manner, such as, for example by adjusting the positioning of the cable clamp relative to the feeder tube 20.

The cable clamp can have any suitable construction. For example, the cable clamp, may include a commercially-available fastener, comprising a wing nut and a threaded bolt adjustably engageable with the wing nut. The wing nut may include a threaded inner wall that defines a bore, and a stem within the bore. The bolt may define a diametrical slot for receiving the cords 130 and the stem of the wing nut. Thus, the cable clamp can be positioned on the cords 130 and the wire 14 at the appropriate position, and the wing nut twisted to lock the cable clamp in place.

In accordance with a preferred embodiment, the windows 38 are substantially open when the cone member 24 is in the raised position (see FIG. 1). The lowering of the cone member 24 relative to the feeder tube 20 causes the windows 38 to become closed by the rim 100 of the cone member and also reduces the size of the feed opening 30. If desired, the cone member 24 can be adjusted between its raised and lowered position to achieve the desired position relative to the feeder tube 20 such that the windows 38 are only partially closed by the rim 100 and the feed openings 20 are the desired size. Additionally, the wing members 22 can be adjusted relative to the pan member 26 also to adjust the size of the feed opening 30 and to adjust the elevation of the windows 38.

As a result, with the present invention, the opening and closing of the windows 38 and the elevation of the windows, and the size of the feed opening 30, can be adjusted in fine increments over a wide range of sizes. These adjustment features provide the poultry grower with added convenience.

The foregoing description is for purposes of illustration only and is not intended to limit the scope of protection accorded this invention. The scope of protection is to be measured by the following claims, which should be interpreted as broadly as the inventive contribution permits.

The claimed invention is:

1. A feeder assembly for birds or other animals comprising:
   (a) a pan member;
   (b) a feeder tube defining a channel for receiving feed from a feed supply and defining a brood gate opening adapted to permit at least some of the feed to pass therethrough;
   (c) a plurality of wing members joined to the feeder tube; and
   (d) a cone member disposed about the feeder tube and slidably mounted to the wing members, the cone member adapted to slide relative to the feeder tube between a raised position and a lowered position to substantially open and substantially close the brood gate opening, the pan member and an end of the cone member defining a feed opening for permitting feed to pass from the feeder tube to the pan member for presentation and consumption, the feed opening decreasing in size as the cone member is moved toward the lowered position.

2. The feeder assembly of claim 1 wherein the brood gate opening comprises a plurality of windows defined by the feeder tube.

3. The feeder assembly of claim 1 wherein the cone member is adapted to be adjustably positioned relative to the feeder tube to adjust the size of the feed opening and to partially open and partially close the brood gate opening in an adjustable manner.

4. The feeder assembly of claim 1 wherein the cone member includes a rim adjacent its upper end for substantially closing the brood gate opening when the cone member is in the lowered position.

5. The feeder assembly of claim 4 wherein the rim is annular and slidingly engages the feeder tube.

6. The feeder assembly of claim 1 wherein the brood gate opening is received by the cone member when the cone member is in the raised and lowered positions.

7. The feeder assembly of claim 1 wherein the feeder tube includes a collar adjacent its lower end extending below a portion of each of the wing members.

8. The feeder assembly of claim 1 wherein each of the wing members includes a plurality of fingers at its distal end for adjustably engaging the pan member, for adjusting the size of the feed opening, and for adjusting the elevation of the brood gate opening.

9. The feeder assembly of claim 8 wherein the cone member includes a plurality of engaging arms slidably engaging the wing members, and each of the wing members defines an aperture for slidably receiving a respective engaging arm.

10. The feeder assembly of claim 9 wherein each of the engaging arms includes a locking ledge adapted to engage a respective wing member when the cone member is in the raised position to prevent the cone member from disengaging from the wing members.

11. The feeder assembly of claim 9 wherein each wing member comprises a wing portion and a connecting portion connecting the wing portion to the feeder tube, each wing portion including a top wall and each aperture being defined by a respective top wall.

12. The feeder assembly of claim 1 wherein the wing members and the feeder tube are integral with each other.

13. The feeder assembly of claim 1 further including a connector for engaging the feeder assembly with a support of a poultry feeding system and for adjustably positioning the cone member relative to the feeder tube.

14. The feeder assembly of claim 13 wherein the connector includes a pair of cords secured to the cone member and a locking member connecting the cords together.

15. A feeder assembly for birds or other animals comprising:
   (a) a pan member having an upstanding peripheral wall;
   (b) a feeder tube defining a channel for receiving feed from a feed supply and defining a brood gate opening adapted to permit at least some of the feed to pass therethrough;
   (c) a plurality of wing members integral with the feeder tube adjustably engaging the peripheral wall, each wing member defining an aperture; and
   (d) a cone member disposed about the feeder tube and including a plurality of engaging arms slidably received by the apertures of the wing member to permit sliding of the cone member relative to the wing members and feeder tube between a raised position and a lowered position to substantially open and substantially close the brood gate opening, the pan member and an end of the cone member defining a feed opening for permitting feed to pass from the feeder tube to the pan member for presentation and consumption, the size of the feed opening being adjustable by adjusting the positioning of the wing members relative to the peripheral wall of the pan member and by sliding the cone member relative to the wing members and the feeder tube.

16. The feeder assembly of claim 15 wherein the cone member is adapted to open and close the brood gate opening in an adjustable manner by sliding the cone member relative to the feeding tube and wherein the elevation of the brood gate opening is adjustable by adjusting the positioning of the wing members relative to the peripheral wall of the pan member.

17. The feeder assembly of claim 15 wherein the brood gate opening comprises a plurality of windows defined in the feeder tube.

18. The feeder assembly of claim 15 wherein the cone member includes a rim near its upper end for substantially closing the brood gate opening when the cone member is in the lowered position.

19. The feeder assembly of claim 18 wherein the rim is annular and slidingly engages the feeder tube.

20. The feeder assembly of claim 15 wherein the brood gate opening is received by the cone member when the cone member is in the raised and lowered positions.

21. The feeder assembly of claim 15 wherein each wing member includes at its distal end a plurality of engaging fingers adjustably engaging the peripheral wall and each of the engaging arms includes a locking ledge adapted to engage a respective wing member when the cone member is in the raised position to prevent the cone member from disengaging from the wing members.

22. The feeder assembly of claim 15 wherein the feeder tube includes a collar adjacent its lower end extending below a portion of each of the wing members.

23. The feeder assembly of claim 15 wherein the wing members and the feeder tube are integral with each other.

* * * * *